United States Patent
Seung

(10) Patent No.: US 8,773,961 B2
(45) Date of Patent: Jul. 8, 2014

(54) COPY-PROTECTED OPTICAL RECORDING MEDIUM, METHOD FOR DRIVING THEREOF AND METHOD FOR MANUFACTURING THEREOF

(71) Applicant: Settec, Inc., Seoul (KR)

(72) Inventor: Heung-Chan Seung, Seoul (KR)

(*) Notice: Subject to any disclaimer, the term of this patent is extended or adjusted under 35 U.S.C. 154(b) by 2 days.

(21) Appl. No.: 13/764,734

(22) Filed: Feb. 11, 2013

(65) Prior Publication Data

US 2013/0155830 A1   Jun. 20, 2013

Related U.S. Application Data

(63) Continuation of application No. 12/023,045, filed on Jan. 31, 2008, now abandoned, which is a continuation of application No. 10/477,582, filed as application No. PCT/KR02/00490 on Mar. 22, 2002, now abandoned.

(51) Int. Cl.
*G11B 7/007* (2006.01)
*G11B 20/00* (2006.01)

(52) U.S. Cl.
CPC .... *G11B 20/00688* (2013.01); *G11B 20/00644* (2013.01); *G11B 20/00086* (2013.01)
USPC ................ 369/53.21; 369/275.3

(58) Field of Classification Search
USPC .......... 369/53.21, 275.1, 275.3, 275.5, 44.32, 369/47.12, 84
See application file for complete search history.

(56) References Cited

U.S. PATENT DOCUMENTS

| | | | |
|---|---|---|---|
| 4,097,908 A | | 6/1978 | Chou et al. |
| 4,807,218 A | | 2/1989 | Gerber |
| 5,091,635 A | * | 2/1992 | Akatsuka et al. ............ 235/494 |
| 5,200,941 A | | 4/1993 | Matoba et al. |
| 5,265,048 A | | 11/1993 | Kimura |
| 5,321,675 A | | 6/1994 | Ito et al. |
| 5,473,584 A | | 12/1995 | Oshima |
| 5,523,988 A | | 6/1996 | Chiba |
| 5,659,613 A | | 8/1997 | Copeland et al. |
| 5,661,800 A | | 8/1997 | Nakashima et al. |
| 5,666,336 A | | 9/1997 | Yoshida |
| 5,826,057 A | | 10/1998 | Okamoto et al. |
| 5,850,382 A | | 12/1998 | Koishi et al. |
| 5,883,959 A | | 3/1999 | Kori |
| 5,886,985 A | * | 3/1999 | Kobayashi et al. ........ 369/275.3 |

(Continued)

FOREIGN PATENT DOCUMENTS

| | | |
|---|---|---|
| JP | 62150564 | 7/1987 |
| JP | 2001110137 | 4/2001 |

(Continued)

OTHER PUBLICATIONS

International Search Report in International Application No. PCT/KR2002/000490, dated Dec. 24, 2002.

(Continued)

*Primary Examiner* — Thomas Alunkal
(74) *Attorney, Agent, or Firm* — Park, Kim & Suh, LLC

(57) ABSTRACT

A copy-protected optical recording medium, a method for driving thereof and a method for manufacturing thereof, wherein the optical recording medium includes at least one region whose address is designated to be said same with that of other region of the medium.

10 Claims, 7 Drawing Sheets

(recorded data structure of original recording medium)

(56) References Cited

U.S. PATENT DOCUMENTS

| | | | |
|---|---|---|---|
| 5,930,209 A * | 7/1999 | Spitzenberger et al. | 369/30.05 |
| 5,959,948 A | 9/1999 | Oshima | |
| 5,963,909 A | 10/1999 | Warren et al. | |
| 6,002,657 A | 12/1999 | Furukawa et al. | |
| 6,105,103 A | 8/2000 | Courtright et al. | |
| 6,125,181 A | 9/2000 | Gotho et al. | |
| 6,163,522 A | 12/2000 | Nakane et al. | |
| 6,278,671 B1 * | 8/2001 | Gotoh et al. | 369/47.19 |
| 6,317,407 B1 * | 11/2001 | Takemura et al. | 369/275.3 |
| 6,320,829 B1 | 11/2001 | Matsumoto et al. | |
| 6,418,111 B1 | 7/2002 | Takemura et al. | |
| 6,425,098 B1 | 7/2002 | Sinquin et al. | |
| 6,496,943 B1 | 12/2002 | Belser et al. | |
| 6,564,311 B2 | 5/2003 | Kakeda et al. | |
| 6,580,682 B1 | 6/2003 | Kamperman et al. | |
| 6,597,648 B1 * | 7/2003 | Yeo et al. | 369/53.2 |
| 6,671,249 B2 | 12/2003 | Horie | |
| 6,707,785 B1 | 3/2004 | Kato | |
| 6,782,190 B1 | 8/2004 | Morito | |
| 6,980,653 B1 | 12/2005 | Sako et al. | |
| 6,995,845 B2 | 2/2006 | Worthington | |
| 7,068,581 B2 | 6/2006 | Katoh et al. | |
| 7,126,906 B2 | 10/2006 | Iida | |
| 7,130,252 B2 | 10/2006 | Sako | |
| 7,149,175 B2 | 12/2006 | Sako et al. | |
| 2001/0021154 A1 | 9/2001 | Katoh et al. | |
| 2001/0024411 A1 * | 9/2001 | Pirot et al. | 369/53.21 |
| 2002/0006093 A1 * | 1/2002 | Kobayashi et al. | 369/53.21 |
| 2002/0015369 A1 * | 2/2002 | Kobayashi | 369/53.21 |
| 2002/0064111 A1 | 5/2002 | Horie | |
| 2002/0071359 A1 | 6/2002 | Washington | |
| 2002/0097648 A1 | 7/2002 | Iida | |
| 2002/0124071 A1 | 9/2002 | Proehl et al. | |
| 2003/0070057 A1 | 4/2003 | Kakeda et al. | |
| 2004/0030983 A1 * | 2/2004 | Tomita | 714/776 |

FOREIGN PATENT DOCUMENTS

| | | |
|---|---|---|
| KR | 10-200879 B1 | 3/1999 |
| KR | 10-2001-0069577 A | 7/2001 |
| WO | 9854713 | 12/1998 |
| WO | 0021085 | 4/2000 |
| WO | 0159774 | 8/2001 |

OTHER PUBLICATIONS

U.S. Office Action in U.S. Appl. No. 10/477,582 dated Feb. 20, 2007.
U.S. Office Action in U.S. Appl. No. 12/023,045 dated Aug. 2, 2010.
U.S. Office Action in U.S. Appl. No. 12/023,045 dated Apr. 19, 2012.
U.S. Office Action in U.S. Appl. No. 12/023,045 dated Oct. 16, 2012.

* cited by examiner (recorded data structure of original recording medium)

(recorded data structure of copied recording medium)

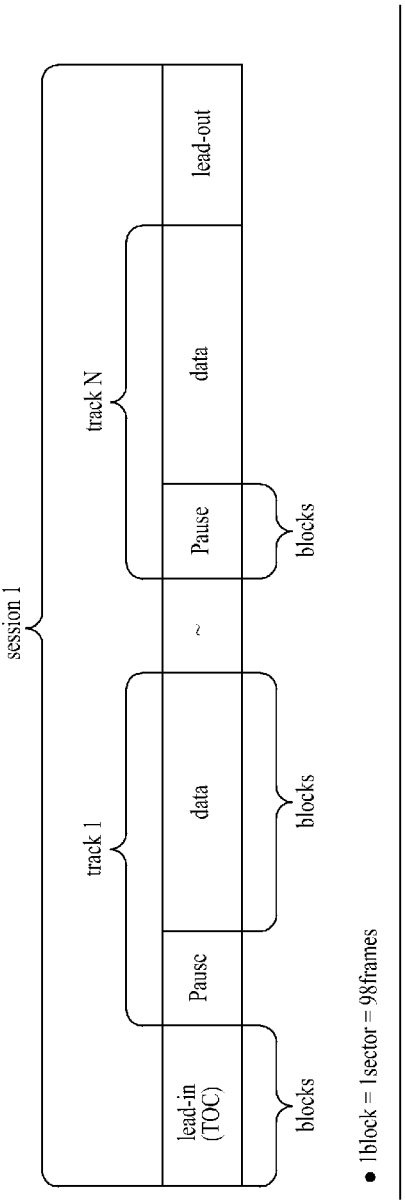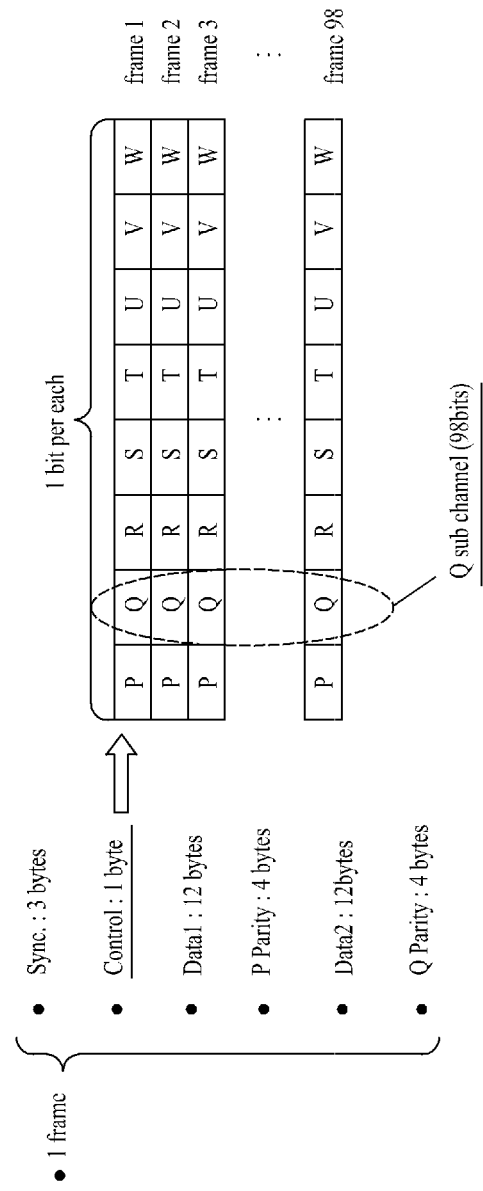

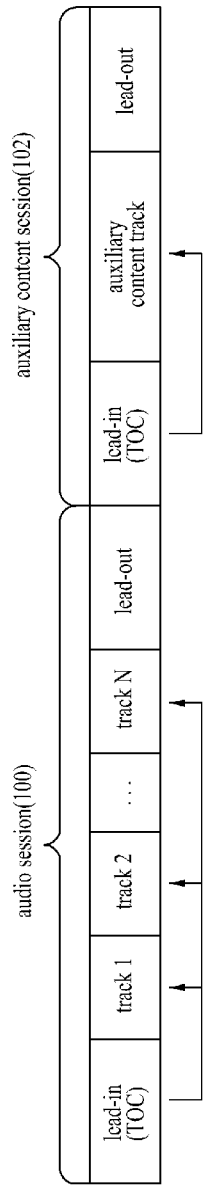

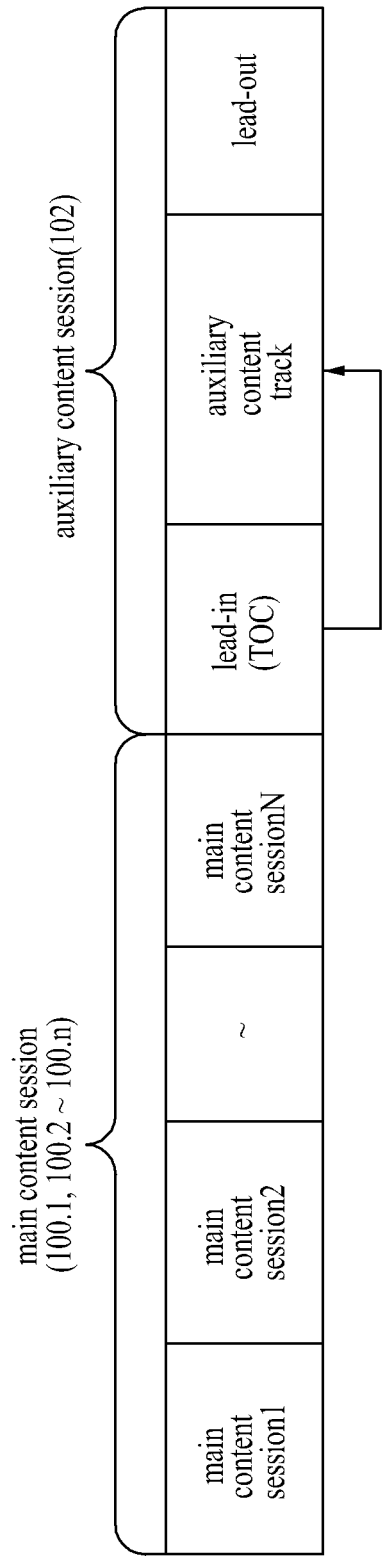

COPY-PROTECTED OPTICAL RECORDING MEDIUM, METHOD FOR DRIVING THEREOF AND METHOD FOR MANUFACTURING THEREOF

CROSS REFERENCE TO RELATED APPLICATIONS

This application is a continuation of the U.S. Application having Ser. No. 12/023,045, filed on Jan. 31, 2008, which is a continuation of the U.S. application having Ser. No. 10/447,582, filed May 5, 2004, now abandoned, which is a National Stage Application of PCT International Patent Application No. PCT/KR02/00490, filed on Mar. 22, 2002, which are all hereby incorporated by reference in their entirety.

BACKGROUND OF THE INVENTION

1. Field of the Invention

The present invention relates to a copy-protected optical recording medium on/from which digital contents such as audio, video and computer readable data recorded/reproduced and a method for manufacturing thereof, and more particularly to an optical recording medium prevented from being copied by manipulating address information in a recording area and a method for manufacturing thereof.

The present invention relates to an optical recording medium, which is or will be in existence, such as an audio compact disc, a combination of compact discs, a compact disc including other optical recording medium, a compact disc included in other optical recording medium and CD-R (CD-Recordable) or CD-RW (CD-Rewritable).

Moreover, the present invention is also applied to a recording medium on which digital information such as high quality video signals is recorded, for example DVD (Digital Versatile Disc or Digital Video disc), DVD-R (DVD-Recordable), DVD-RW (DVD-Rewritable) and DVD-RAM (DVD-Random Access Memory).

2. Description of the Prior Art

Generally, for example, in order to extract the information recorded on the recording medium by controlling the medium in regard to a reproducing apparatus, it is necessary to obtain the address information indicating where the information is recorded. It is widely known in the art field of the present invention about the recording type of the information for recording this address information and the contents information on the recording medium or the information structure of the recording medium.

FIG. 1 shows an exemplary structure of the information recorded on the general DVD. As shown in FIG. 1, the information recorded on the DVD composes a '(information) sector' with a predetermined quantity of it. FIG. 1 shows the case the information sectors are 17 on the whole. Each of the information sectors includes the content information of 172 bytes and horizontally error correcting parity data of 10 bytes. And, the 17-th sector includes vertically error correcting parity data of 10 bytes. FIG. 1 shows merely an example of the information structure of the general DVD, so it does not restrict the scope of the present invention.

In the recording medium with the information structure above, the address data represents which position on the recording medium certain information is stored at, and thus a part of the address data may serve as the information indicating the position of the sector. The reproducing apparatus generates the required control signals by using this address data and performs the producing operation. For example, when the reproducing apparatus moves over the recording medium or reproduces the medium from certain position, it can control the searching operation of the information recorded on the medium by referring to the address data.

Recently, however, it is possible to read the information recorded on the optical recording medium easily by using the general personal computer. Consequently, the very easy and diverse illegal copying prevails. So, the protection of the copyright of the contents recorded on the medium has become an urgent issue.

In order to solve the problem various measures have been presented. As one of the measures, generally, when the audio CD or the CD-ROM is copied, the information on the lead-in area, namely TOC (Table Of Contents), such as the information stored in the recording medium and the predetermined control information, should be read, so there has been a try to solve the problem above. That is, according to "CD reproducing control method without TOC" (Korean Patent No. 200879), in order to prevent the illegal copying of the information on the recording medium by removing the TOC of the CD-ROM or the audio CD and reproduce both the recording medium prevented from being copied illegally and a general recording medium, it is disclosed that a reproducing control method of a CD without a TOC for preventing the illegal copying, includes the steps of:

(1) verifying whether the TOC is read, (2) going to a predetermined track and reading information from the track, if the TOC is not read in the step (1), (3) verifying whether the information, which is read in the step (2), is read from the recording medium without the TOC and (4) reading in accordance with a new format if the recording medium does not have the TOC, or reading in accordance with a general format if the information is from the lead-in area in the step (3).

According to the method above, however, there is a problem that it is impossible to reproduce the contents recorded on a copy-protected recording medium only with a general reproducing apparatus, because the TOC of the recording medium should be removed artificially, and the reproducing apparatus should be specially programmed and carried out in accordance with the steps above. That brings users a problem that they have to buy an appropriate reproducing apparatus anew besides the recording medium.

SUMMARY OF THE INVENTION

Therefore, it is an object of the present invention to provide a copy-protected optical recording medium capable of being reproduced by a general reproducing apparatus and a method for manufacturing thereof, which is capable of overcoming the above drawbacks accompanying the conventional art. The above and other objects can be achieved by combinations described in the independent claims. The dependent claims define further advantageous and exemplary combinations of the present invention.

According to the first aspect of the present invention, a copy-protected optical recording medium capable of being reproduced by a general reproducing apparatus, comprises at least one overlapping zone whose address values allocated to information recorded on the recording medium overlap with address values of another area in the recording medium and driving information for controlling the reproducing apparatus to read information on the overlapping zone.

The driving information may comprise a reverse progress instruction forcing the reproducing apparatus to reverse the direction of the reading progress before or after the overlapping zone is retrieved.

The driving information may comprise a jumping address instruction forcing the reproducing apparatus to jump an area whose address values are equivalent to those of the overlapping zone in reading progress, if the reproducing apparatus attempts at least two times to read information at a position whose address value is the same as one of the overlapping zone.

The driving information may comprise a redundant information ignoring instruction forcing the reproducing apparatus to ignore information, which is read repeatedly, if the reproducing apparatus attempts at least two times to read information at a position whose address value is the same as one of the overlapping zone.

The original medium discriminating information may be recorded on the overlapping zone, the original medium discriminating information discriminating whether or not a recording medium is original.

The driving information may comprise a duplicate reproduction inhibiting instruction which inhibits the reproducing apparatus from reproducing a recording medium considered as a duplicate. At least a part of the driving information may be recorded on the overlapping zone.

At least a part of an application program required for reproducing information on the optical recording medium may be recorded on the overlapping zone. The copy-protected optical recording medium may further comprise at least one OHD (Optical Head Ditching) area provided between areas except the overlapping zone. The copy-protected optical recording medium may further comprise at least one OHD area provided within the overlapping zone.

According to the second aspect of the present invention, a method for manufacturing a copy-protected optical recording medium capable of being reproduced by a general reproducing apparatus, comprises the steps of forming at least one overlapping zone whose address values allocated to information recorded on the recording medium overlap with address values of another area in the recording medium and recording driving information for controlling the reproducing apparatus to read information on the overlapping zone at a predetermined position.

The driving information may comprise a reverse progress instruction forcing the reproducing apparatus to reverse the direction of the reading progress before or after the overlapping zone is retrieved.

The driving information may comprise a jumping address instruction forcing the reproducing apparatus to jump an area whose address values are equivalent to those of the overlapping zone in reading progress, if the reproducing apparatus attempts at least two times to read information at a position whose address value is the same as one of the overlapping zone.

The driving information may comprise a redundant information ignoring instruction forcing the reproducing apparatus to ignore information, which is read repeatedly, if the reproducing apparatus attempts at least two times to read information at a position whose address value is the same as one of the overlapping zone.

The original medium discriminating information may be recorded on the overlapping zone, the original medium discriminating information discriminating whether or not a recording medium is original.

The driving information may comprise a duplicate reproduction inhibiting instruction which inhibits the reproducing apparatus from reproducing a recording medium considered as a duplicate. At least a part of the driving information may be recorded on the overlapping zone.

At least a part of an application program required for reproducing information on the optical recording medium may be recorded on the overlapping zone. The method for manufacturing a copy-protected optical recording medium may further comprise at least one OHD area provided between areas except the overlapping zone. The method for manufacturing a copy-protected optical recording medium may further comprise at least one OHD area provided within the overlapping zone.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3b shows a series of pieces of the information extracted from the recording medium according to the progress shown in FIG. 3a.

FIG. 3c shows the information on the duplicated medium, when the information is copied from the recording medium according to the sequence shown in FIG. 3a.

FIG. 4 shows virtually arranging a plurality of pieces of information in a row, which are recorded on the audio CD in accordance with the Red Book Standard and included in a session.

FIG. 5 shows the structure of one of frames of which the information block recorded on the lead-in area of the information shown in FIG. 4 consists.

FIG. 6 shows the structure of the Q sub channel of the 8 sub channels consisting of the control information of the frames shown in FIG. 4.

FIG. 7 shows virtually arranging a plurality of pieces of information in a row, which are recorded on the copy-protected optical recording medium according to an exemplary embodiment of the present invention.

FIG. 9 shows virtually arranging a plurality of pieces of information in a row, which are recorded on the copy-protected optical recording medium according to another exemplary embodiment of the present invention.

DETAILED DESCRIPTION

The invention will now be described based on the preferred embodiments, which do not intend to limit the scope of the present invention, but exemplify the invention. All of the features and the combinations thereof described in the embodiment are not necessarily essential to the invention.

Figure 2A:
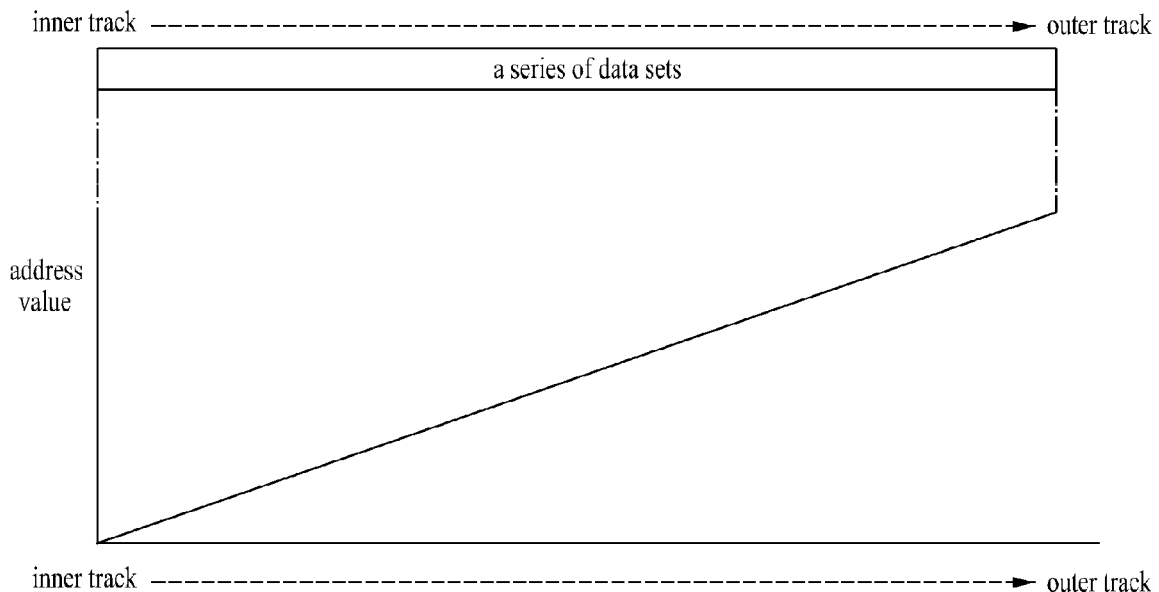
FIG. 2a shows a series of information data obtained by virtually arranging a plurality of pieces of information in a row which are recorded on a general optical recording medium from its innermost track to its outermost track, and addresses allocated to the series of information data.
Figure 2B:
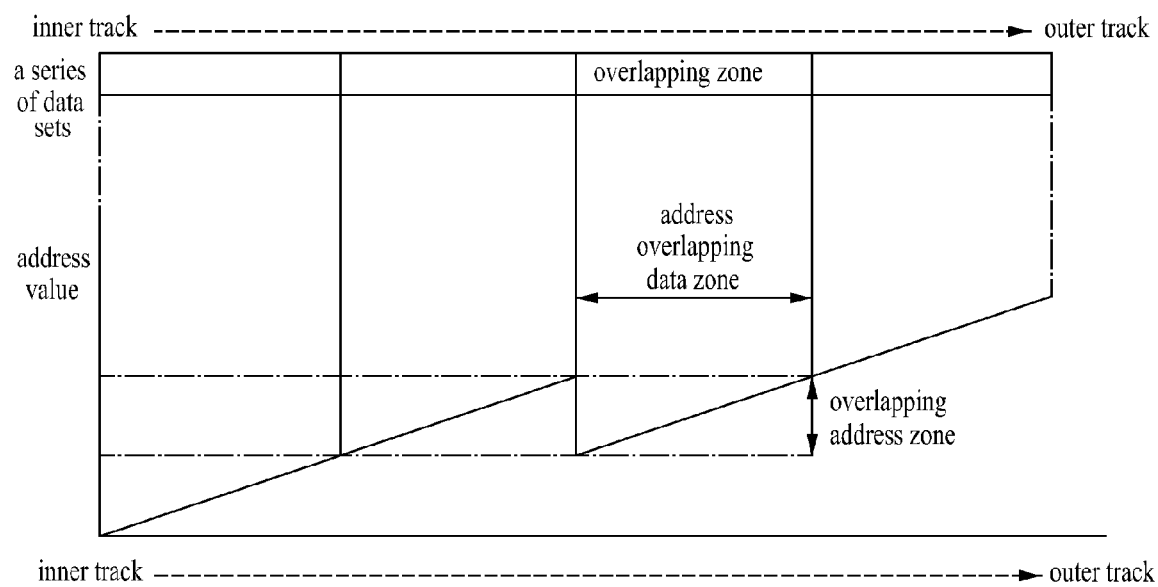
FIG. 2b shows a series of information data obtained by virtually arranging a plurality of pieces of information in a row which are recorded on the copy-protected optical recording medium according to aspects of the invention from its innermost track to its outermost track, and addresses allocated to the series of information data.

Referring to FIG. 2a and FIG. 2b, FIG. 2a shows a series of information data obtained by virtually arranging a plurality of pieces of information in a row which are recorded on a general optical recording medium from its innermost track to its outermost track, and addresses allocated to the series of information data. In contrast, FIG. 2b shows a series of information data obtained by virtually arranging a plurality of information in a row which are recorded on the copy-protected optical recording medium according to the present invention from its innermost track to its outermost track, and addresses allocated to the series of information data.

As shown in FIG. 2a, the addresses of the information on the general optical recording medium are allocated in order to linearly increase from the inner tracks to the outer tracks of the medium in order. The linearly increased graph at the bottom of the series of pieces of the information shows this state. Also, the addresses may linearly decrease from the inner tracks to the outer tracks.

Moreover, in another optical recording medium already known, the information may be placed on the medium in disorder by scrambling the address data. In this way, the reproduction ratio can be increased by correcting the errors, even if physical damage occurs on the medium. In this case, however, as supposing the state, where the extracted information is placed in a row as shown in FIG. 2a, we can understand that the addresses of the information linearly increase (or decrease) conceptually.

Figure 3A:
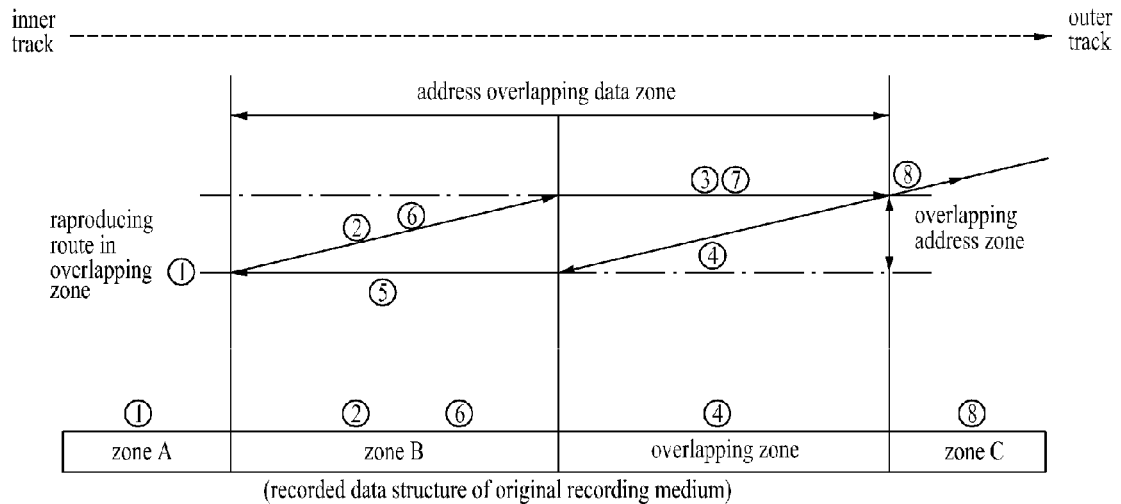
FIG. 3a shows the method for driving the copy-protected optical recording medium according to the present invention.

In the meantime, as shown in FIG. 2b, the copy-protected optical recording medium according to the present invention includes at least one overlapping zone whose addresses allocated to the information on the medium overlap each other. The addresses may be either the physical addresses or the logical addresses. If the physical addresses overlap, the overlapping zone can be embodied by forming a zone whose addresses overlap at a predetermined position on the medium during manufacturing the medium. If logical addresses overlap, the overlapping zone can be embodied by recording the data different from others on an area, in which each of the physical addresses different from others is allocated, of the medium but allocating the logical addresses to overlap each other in a predetermined area. In FIG. 3a, we see the addresses in the overlapping zone and the previous zone, namely, the zone B overlap.

Moreover, the copy-protected optical recording medium according to the present invention further includes driving information for controlling the drive of the reproducing apparatus for reading the information recorded on the overlapping zone. The data on the zone B has the same address value as that of the corresponding data on the overlapping zone, so the driving information is for driving the reproducing apparatus to access the addresses respectively.

That is, referring to FIG. 3a, FIG. 3a shows the method for driving the copy-protected optical recording medium according to the present invention. In order to reproduce the copy-protected optical recording medium according to the present invention, the already known reproducing apparatus for the optical recording medium may be used. Here, we assume that the general reproducing apparatus reads the information from the least address value to the largest address value of the medium in increasing sequence.

According to the assumption above, the reproducing apparatus first reads the information on the zone A whose address values are relatively small (①), and goes on toward the zone B whose address values are larger than those of the zone A(②).

After finishing reading the information of the zone B, the reproducing apparatus progresses toward the front of the zone C whose address values are larger than those of the zone B in order to read the information of the zone C(③).

At this time, the driving information instructs the reproducing apparatus to perform the reading operation backwardly ('reverse progress instruction'). Accordingly, the reproducing apparatus starts to read the information toward the area whose address value gets small, that is, from the back to the front of the overlapping zone(④).

Even after finishing reading in the overlapping zone, the reproducing apparatus keeps on progressing toward the area whose address value decreases. In other words, the reproducing apparatus progresses toward the back of the zone A(⑤)

At this time, the driving information gives the reverse progress instruction to the reproducing apparatus to perform the reading operation backwardly again. Consequently, the reproducing apparatus reads the information on the zone B whose address value gets large again(⑥)

As finishing reading in the zone B, the reproducing apparatus goes on toward the front of the zone C again(⑦), and then reads the information on the zone C(⑧).

Therefore, by recording the driving information for giving the reverse progress instruction mentioned above to the reproducing apparatus onto the recording medium, the information on the overlapping zone is read.

Figure 3B:
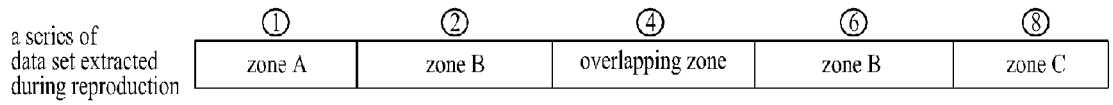

According to the embodiment above, the information on the area whose address value is the same as that of the overlapping zone, namely, on the zone B is extracted repeatedly in case either the reading position of the reproducing apparatus gets into the overlapping zone in the forward reading progress or the reading position of the reproducing apparatus gets out of the overlapping zone in the backward reading progress. A series of pieces of the information extracted from the recording medium according to the present invention are shown in FIG. 3b, when the general reproducing apparatus reproduces the medium.

Meanwhile, according to another exemplary embodiment, in order to prevent the information on the zone B from being extracted repeatedly, when the reproducing apparatus attempts to read the information on the back of the zone A(i.e., after finishing the process (⑤)), jumping address instruction may be added to the reverse progress instruction, the jumping address instruction for instructing the reproducing apparatus to go straight to the front of the zone C. Alternatively, redundant information ignoring instruction may be added, which instructs the reproducing apparatus to ignore the information extracted repeatedly on the zone B.

The method for driving the reproducing apparatus before or after the overlapping zone is retrieved as mentioned above can be various besides the examples above.

In the meantime, the driving information is activated to be read by the reproducing apparatus and drive the reproducing apparatus. As the method for activating the reproducing apparatus, there can be various methods such that the driving information is read from the recording medium, then loaded into the memory of the reproducing apparatus and then makes the CPU control the operation of the reproducing apparatus.

Referring to FIG. 3b again, FIG. 3b shows a series of pieces of the information extracted from the recording medium according to the progress shown in FIG. 3a. As shown in FIG. 3b, the information on the zone A is extracted, then the information on the zone B, then on the overlapping zone, then on the zone B once again and then on the zone C. Therefore, according to the present invention, even if using the general reproducing apparatus, it is possible to reproduce the whole information on the recording medium by the present invention normally.

When somebody, however, attempts to copy the information on the recording medium according to the present invention by a method already known or newly developed after this application, in order to record the information from the zone B to the overlapping zone onto the duplicated medium he or she should use the address data the same as that allocated to the areas. Consequently, only one of the pieces of the information from the zone B to the overlapping zone is recorded on the zone with the corresponding address value of the duplicated medium.

Figure 3C:
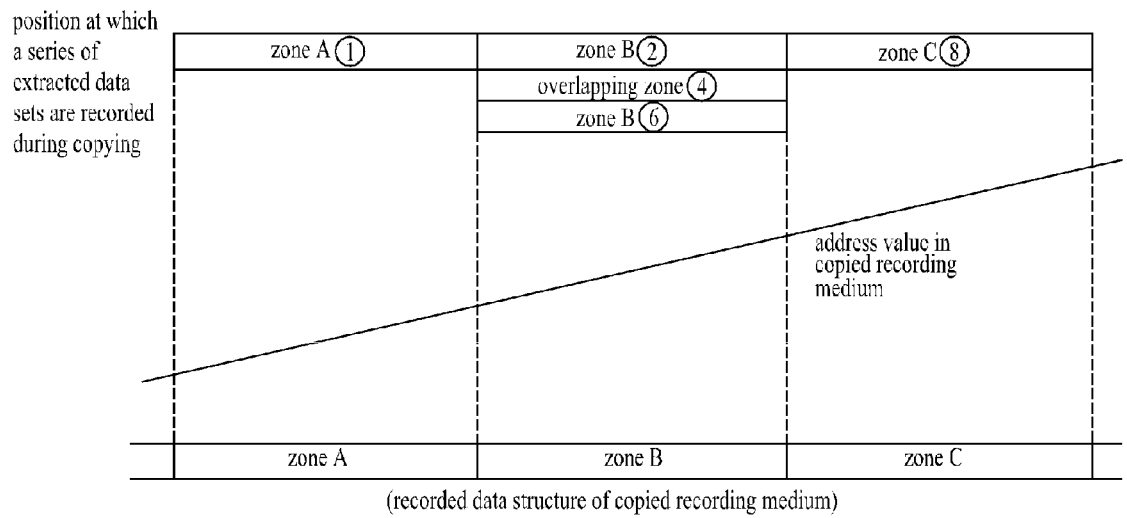

Therefore, when reproducing the duplicated medium, it is impossible to extract one of the pieces of the information from the zone B to the overlapping zone of the original medium from the duplicated medium. Accordingly, some pieces of the information on the original medium remain without being copied to the duplicated medium. Referring to FIG. 3c, FIG. 3c shows the information on the duplicated medium, when the information is copied from the recording medium according to the sequence shown in FIG. 3a. In FIG. 3c, only the information on the zone B is copied.

Moreover, if the driving information is properly copied onto the duplicated medium, when the duplicated medium is reproduced, the reverse progress instruction is given before or after the area of the duplicated medium corresponding to the overlapping zone so that the information on the area is extracted repeatedly. In the example shown in FIG. 3c, the information on the zone B of the original medium will be extracted repeatedly.

Therefore, in case of the duplicated medium, a piece of data extracted from the position to which specific address(es) are allocated is the same regardless of the direction of reading. That is different from the case where pieces of data on the position that the same address is allocated can be different from each other according to the progress direction so that it is possible to discriminate the duplicated medium from the original medium.

Furthermore, according to another exemplary embodiment, when the information on the recording medium is read, original medium discriminating information for discriminating whether or not certain medium is the original may be recorded on the zone B and the overlapping zone. That is, because the original medium discriminating information on the overlapping zone is not copied onto the duplicated medium, the original medium discriminating information is not read during the reproduction so that it is possible to discriminate the duplicated medium from the original medium.

Because of discriminating the duplicated medium from the original medium in the previous way, duplicate reproduction inhibiting instruction may be included in the driving information in order not to reproduce the medium considered as the duplicate.

Furthermore, by recording, for example, second reverse progress instruction onto the overlapping zone, when the reproducing apparatus reproduces the duplicated medium without the second reverse progress instruction, it reads the information on the overlapping zone, and returns to the first position of the duplicate medium. This makes the recording apparatus operate improperly.

According to yet another exemplary embodiment, by recording all or a part of the application programs required for reproducing the information on the recording medium onto the overlapping zone, it may be impossible to reproduce the duplicated medium.

In the meantime, other exemplary embodiments will now be described in detail with FIG. 4 to FIG. 9 by taking a compact disc, a kind of the optical recording medium, as an example. According to this embodiment, the optical recording medium has a main content session 100 on which the original information ('main contents') to be reproduced, an auxiliary session 102 including such overlapping zone as described in regard to FIG. 1 to FIG. 3 in order to protect the copy.

Generally, a standard, which is called "Red Book Standard", has been presented in regard to a format for recording the audio contents, such as music, on the compact disc. According to the Red Book Standard, the audio CD has a number of tracks and the tracks are indexed and systematized. Referring to FIG. 4, FIG. 4 shows virtually arranging a plurality of pieces of information in a row, which are recorded on the audio CD in accordance with the Red Book Standard and included in a session. As shown in FIG. 4, the audio information recorded on the audio CD includes a lead-in area, which is first accessed by the reproducing apparatus, a plurality of tracks (track 1 to track N), each of which includes both a pause area and a data area, and a lead-out area, which indicates the end of the session.

And, also each of the area includes a plurality of information blocks (which are also called "sectors"), and a block includes 98 frames. Each of the frames, of which one of the information blocks recorded on the lead-in area consists, is composed as shown in FIG. 5. That is to say, a frame, which is recorded on the lead-in area, includes synchronization control information of 3 bytes (Sync), control information of 1 byte (Control), first content data information of 12 bytes (Data1), P parity information of 4 bytes (P Parity), second content data information of 12 bytes (Data2) and Q parity information of 4 bytes (Q Parity).

In other words, each of the 98 frames, of which one of the information blocks recorded on the lead-in area consists, includes the control information of 1 byte and the control information of 1 byte consists of 8 sub codes, each of which has information of 1 bit. Each of the 8 sub codes is called P, Q, R, S, T, U, V and W field respectively. The sub codes form 8 sub channels, each of which is called P, Q, R, S, T, U, V and W sub channel respectively, over the 98 frames included in one of the information blocks. Each of the sub channels consists of 98 bits including 2 synchronization bits and 96 data bits.

FIG. 6 shows the structure of the Q sub channel of the 8 sub channels consisting of the control information above. Other sub channels (P, R, S, T, U, V and W sub channel) are similar to the Q sub channel but transfer different information. As shown in FIG. 6, the first 2 bits of the Q sub channel represent synchronization patterns S0 and S1. The synchronization patterns S0 and S1 are used for synchronizing the reproducing apparatus to rotate the recording medium with the constant leaner velocity.

Following the synchronization patterns S0 and S1, control (Cont) field of 4 bits is recorded, which indicates the number of audio channels of the contents recorded on the recording medium and the existence of emphasis, and especially may show whether the contents of the track are the audio contents or the data contents storing the computer readable information.

The next 4 bits are address (Adr) field and designate the mode for a format of the Q sub channel. Although mode 1, mode 2, mode 3 etc., for example, are known as the format of the Q sub channel, only the case that the address field value is "0001", that is, the format mode is mode 1, will be described here as an example (if the Q sub channel has the format of mode 1, it has a structure like the format shown in FIG. 6).

Track number (TNO) field follows the address field. 8 bits included in the track number field has a value of 0 to 99 represented in Binary Coded Decimal (BCD) of the second order. Although the value generally indicates the number of the track, the track, where the track number field has a value of "00", is the lead-in track, and the track, where the track number field has a value of "AA", is the lead-out track.

Next, point (Point) field is generally used for indicating the contents by dividing in further detail, represented by the track number, and in this case 8 bits included in the point field has a value of 0 to 99 and indicates the index number in the track. Moreover, in this case three fields indicating an absolute time code of the fields of the Q sub channel shown in FIG. 6, namely, absolute minute (AMin), absolute second (ASec) and absolute frame (Afrm) field respectively have the absolute time values of the track. Here, the absolute time value means the time interval within which the content is reproduced from the first track to the track concerned during the reproduction of the overall recording medium, and the absolute time value is called "address" especially in case of the compact disc. It is because the absolute time value can be used as the information about what address in the recording medium certain information is recorded at.

The values of the Q sub channel and the absolute time code, however, may be used as a different meaning. That is, the value recorded on the absolute time code field (the absolute minute, the absolute second and the absolute frame field), indicates the number of the first track of the session, if the point field included in the Q sub channel of the lead-in area has a value of "A0". Meanwhile, the value recorded on the absolute time code field indicates the number of the last track of the session, if the point field has a value of "A1", and the value recorded on the absolute time code field indicates the address of lead-out area of the session, if the point field has a value of "A2". Particularly, the value recorded on the absolute time code field indicates the address of the next session, if the point field has a value of "B0", and the value recorded on the absolute time code field indicates the address of the first session of the recording medium, if the point field has a value of "C0".

Following the point field, the three fields, minute (Min), second (Sec) and frame (Frm), having the information of 8 bits respectively are recorded as the relative time code fields of the track. The three fields indicate the relative time code of the track in the session.

Following the three fields, zero (Zero) field is included in front of the absolute time code fields. Finally, following the absolute time code fields, crc (CRC) field of 8 bits for error control is included.

Accordingly, by interpreting the information of the Q sub channel of the lead-in area, the reproducing apparatus for the optical recording medium is capable of judging which content is recorded, in which format, at which position on the recording medium and how much quantity of the content. That is, by the data on the control field, whether the content of certain track on the medium is the audio content or the information requiring the additional applications for the reproduction, namely, the data content.

According to the present invention, by manipulating the information on the control field and recording the content information doubly, when the recording medium is copied, the information required for duplicating the medium is not provided without influencing the normal reproducing operation of the reproducing apparatus so that the copy is protected.

FIG. 7 shows virtually arranging a plurality of pieces of information in a row, which are recorded on the copy-protected optical recording medium according to an exemplary embodiment of the present invention. In the exemplary embodiment shown in FIG. 7, the present invention is applied to the audio CD. As shown in FIG. 7, the copy-protected audio CD according to the present invention includes the main content session 100 in which the audio contents are stored, and the auxiliary content session 102 on which the information into which the audio contents on the main content session 100 are converted, which is added in order to protect the copy. As mentioned above, the auxiliary content session 102 includes the overlapping zone described in regard to FIG. 1 to FIG. 3. Furthermore, according to this embodiment, the optical recording medium further includes the driving information described above.

According to the embodiment, the main content session 100 includes a lead-in area with a TOC, at least one track (track 1 to track N) in which the main contents are stored and a lead-out area. Particularly, the TOC of the main content session 100 includes the information indicating the contents on the tracks are not the audio contents but the data contents.

The auxiliary content session 102 include a lead-in area with a TOC, an auxiliary content track in which the auxiliary contents are stored and a lead-out area. For example, the auxiliary contents may be MP3 files which are the audio contents converted to MP3 format. Certain application programs are necessary to reproduce the auxiliary contents, but these applications can be provided by the computer system with the reproducing apparatus. According to this embodiment, however, the applications can also be available by recording them onto the optical recording medium in accordance with the present invention.

According to this embodiment, the auxiliary content session 102 at least one overlapping zone in which the address values allocated to the auxiliary contents overlap each other and the driving information for controlling the drive of the reproducing apparatus to read the information on the overlapping zone.

In this way, it is possible to reproduce the main contents on the main content session 100 either directly according to the kind of the reading apparatus (not shown in drawing) during the reproduction of the audio CD in accordance with the present invention, or by extracting the auxiliary contents on the auxiliary content session 102 and with the support of the corresponding applications.

If copying the audio CD according to the present invention, however, a recording apparatus (e.g., a CD-ROM driver; not shown in drawing) misreads that the information on the main content session is not the audio contents but the data contents by the control field of the TOC in the main content session 100, and thus can not copy the contents properly.

Figure 1:
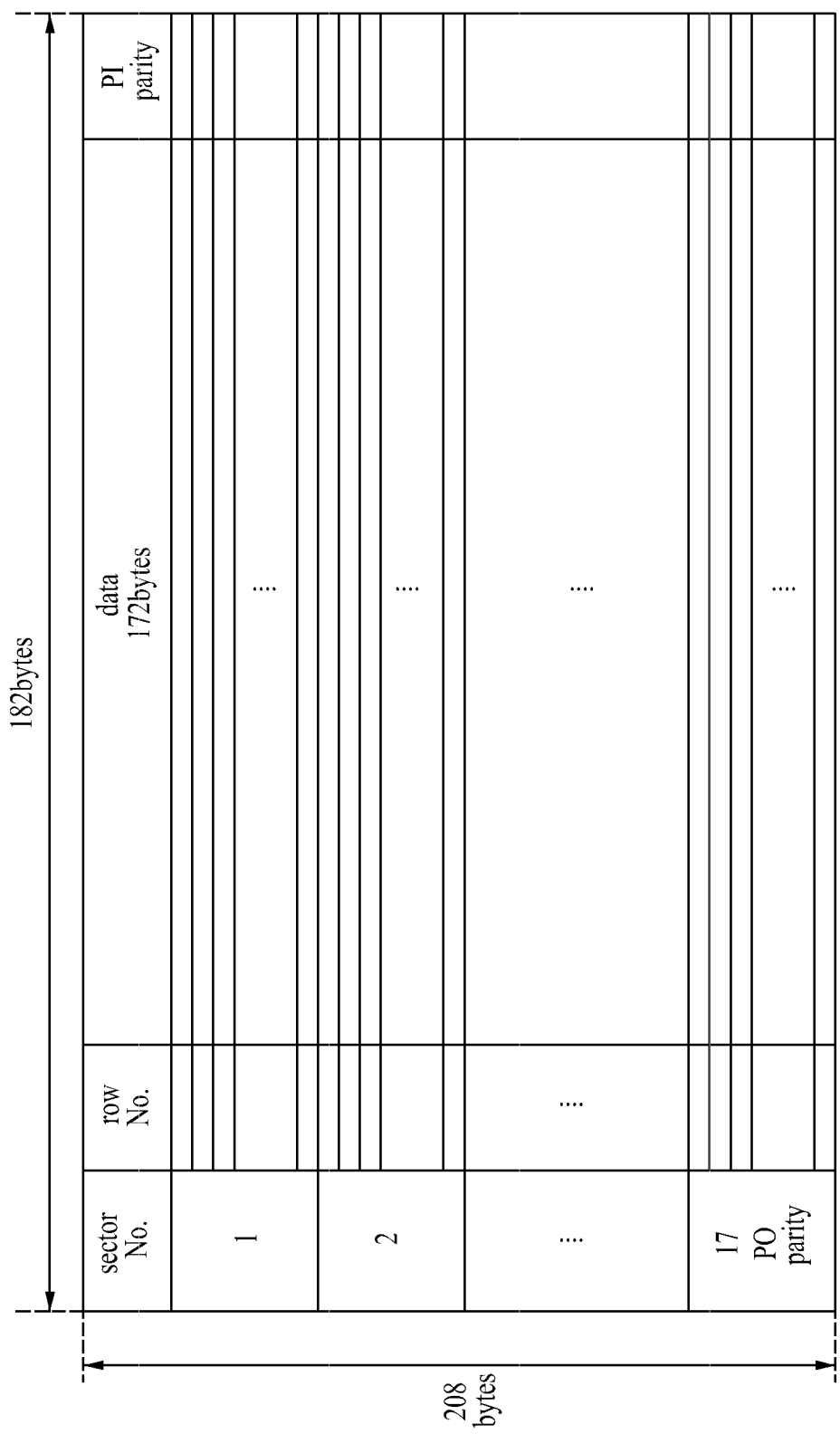
FIG. 1 shows an exemplary structure of the information recorded on the general DVD.

Moreover, because the auxiliary contents of the auxiliary content session 102 are recorded by the method for protecting the copying described in regard to FIG. 1 to FIG. 3, the recording apparatus cannot copy the contents. Therefore, any part of the recording medium according to the present invention is not copied successfully.

Figure 8:
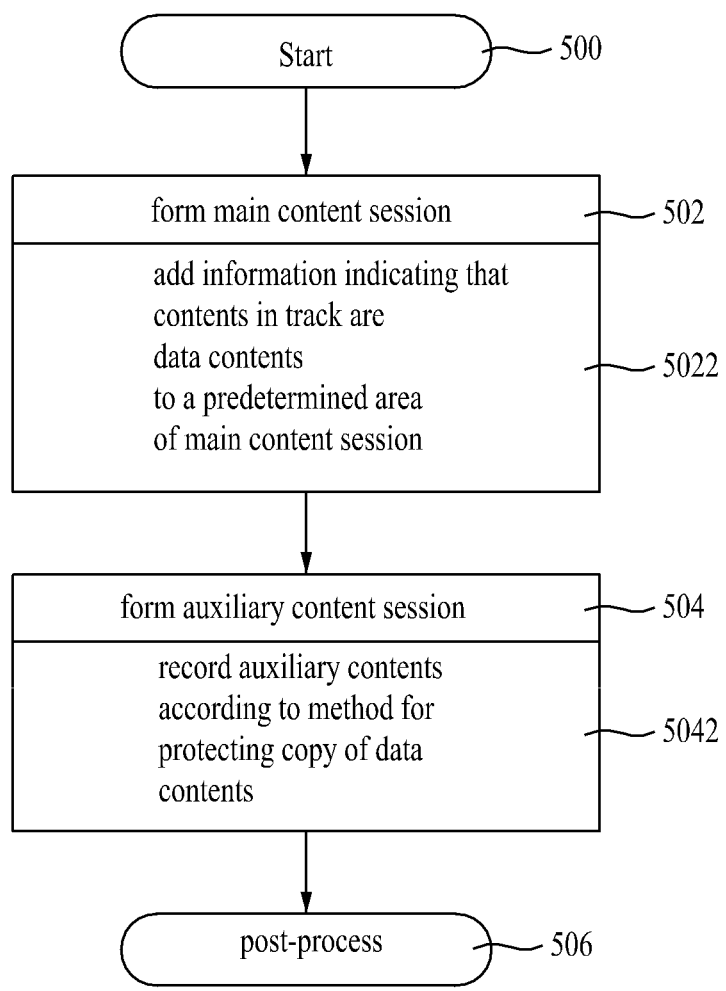
FIG. 8 is a schematic flow chart showing an exemplary embodiment of the method for manufacturing the copy-protected optical recording medium according to the present invention.

Next, an exemplary embodiment of the method for manufacturing the optical recording medium according to the present invention will now be described in detail with FIG. 8. As shown in FIG. 8, the manufacturing process of the copy-protected optical recording medium first starts (step 500), a pre-process is completed by the known method, and the main content session 100 on which the contents such as the audio contents are recorded is formed (step 502). Particularly, in this step 502, it is included that the information indicating that the contents of the tracks (track 1 to track N) on the main content session 100 are the data contents is included in a predetermined area of the main content session 100 (step 5022). According to this embodiment, the information indicating that the information on the main content session 100 is the data contents is included in the TOC of the main content session 100 in the step 5022.

The auxiliary content session 102 then is formed (step 504). Particularly, in this step 504, it is included that the auxiliary contents are stored according to the method for copy protection of data contents (step 5042). According to this embodiment, the auxiliary contents are stored in the auxiliary content session 102 in the step 5042.

Following the step 504, the post-process, which is known, is performed in respect of the method for manufacturing the copy-protected optical recording medium according to the present invention.

Meanwhile, due to the recent commercialization of the computer recordable optical recording medium, it is surely possible to prevent the illegal copying of the recorded information by performing the method including the step 502 to 504 above.

Next, according to another embodiment of the present invention, the present invention is also applied to the optical recording medium including a number of the main content sessions. Referring to FIG. 9, FIG. 9 shows virtually arranging a plurality of pieces of information in a row, which are recorded on the copy-protected optical recording medium according to another exemplary embodiment of the present invention. In FIG. 9, the audio CD to which this invention is applied is taken as an example.

As shown in FIG. 9, the copy-protected audio CD according to the present invention includes a plurality of main content sessions 100.1, 100.2 ... 100.n in which the audio contents are stored, and further includes an auxiliary content session 102 for preventing the copying. The auxiliary content session 102 also includes the overlapping zone described in regard to FIG. 1 to FIG. 3 and the optical recording medium according to the present invention further includes the driving information.

The main content sessions 100.1, 100.2 ... 100.n include lead-in areas with TOCs not shown in drawing, a plurality of tracks in which the audio content information is stored and lead-out areas. Moreover, an auxiliary session 102 includes a lead-in area with a TOC, a first auxiliary track, a second auxiliary track and a lead-out area.

On each of the lead-in areas of the main content sessions 100.1, 100.2 ... 100.n with the TOCs having the general structure, the control information for reproducing each of tracks (not shown in drawing) included in the main content sessions 100.1, 100.2 ... 100.n is recorded, which includes the information indicating that all the information on each of the tracks on the main content sessions 100.1, 100.2 ... 100.n is the data contents.

Moreover, all the description about the auxiliary content session according to the embodiment in regard to FIG. 7 is equally applied to the audio CD according to this embodiment.

Therefore, when the audio CD according to the present invention is inserted into the reproducing apparatus, the reproducing apparatus reproduces the audio contents on the main content session 100.1, 100.2 ... 100.n according to the kind of the reproducing apparatus or by extracting the data contents on the auxiliary content session 102 and with the support of the corresponding applications.

If copying the audio CD according to the present invention, however, a recording apparatus (e.g., a CD-ROM driver; not shown in drawing) misreads that the information on the main content session is not the audio contents but the data contents by the control field of the TOC in the main content session 100, and thus can not copy the contents properly. Moreover, the information on the auxiliary session 102 cannot also be copied, so any part of the optical recording medium according to the present invention is not copied successfully after all.

Except that this embodiment of the method for manufacturing the optical recording medium according to the present invention requires the step of forming the main content session 100.1, 100.2 ... 100.n in regard to the FIG. 8, it is the same as the previous embodiment, so the description in detail of it will be omitted.

According to further another embodiment of the present invention, the information on the copy-protected optical recording medium may be recorded by the method for protecting the copying of the data contents, which is widely known, or the method presented by the application titled "method for manufacturing copy-protected optical disc and optical disc therefor" (Korean Patent Application No. 2001-20805). For example, at least one OHD area may be placed between the areas except the overlapping zone. Alternatively, at least one OHD area may be placed within the overlapping zone.

According to the present invention, it is possible to provide a copy-protected optical recording medium capable of being reproduced without an additional reproducing apparatus and a method for manufacturing thereof.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A non-transitory computer readable recording medium comprising control information formed on the recording medium, which when readable by a reader of a reproducer, performs the steps of the method, the method comprising:

forming a first data region at a first region of the recording medium, the first data region comprising a plurality of information blocks which are allocated with address information, wherein the address information is configured to specify which portion of the plurality of information blocks stores data information; and forming a second data region at a second region of the recording medium, wherein the second data region comprises an overlapping zone having logical address values which are identical to logical address values of the first data region, wherein the first data region is physically located immediately prior to the overlapping zone, wherein the overlapping zone comprises the control information formed to execute a reader to read the first data region in a forward direction bypassing the overlapping zone, and to read the overlapping zone in a reverse direction bypassing the first data region, wherein the control information is configured to execute the reader to start reading the overlapping zone in the reverse direction immediately after the overlapping zone is bypassed in the forward direction,
wherein the recording medium is authenticated by comparing first data read in the forward direction with second data read in the reverse direction by the reader, wherein the recording medium is determined to be an original copy when the first data are different from the second data.

2. The recording medium of claim 1, wherein the overlapping zone includes original medium identifying information for further authentication of the recording medium.

3. The recording medium of claim 2, wherein the overlapping zone further includes an application program required for reproducing the recording medium such that the reader is able to reproduce the recording medium when the recording medium is authenticated.

4. The recording medium of claim 3, wherein the recording medium is an optical recording medium including a main content session and an auxiliary content session, and the overlapping zone is included in the auxiliary content session.

5. The recording medium of claim 4, wherein the main content session includes identifying information indicating that all of data included in the main content session are data contents.

6. A method of authenticating a recording medium comprising:
reading a recording medium in a forward direction, the recording medium including an address overlap zone and a data zone physically located immediately prior to the address overlap zone, the address overlap zone having logical address values identical to logical addresses of the data zone, wherein the data zone is read but the address overlap zone is bypassed while the recording medium is read in the forward direction;
reading the recording medium in a reverse direction immediately after the address overlap zone is bypassed in the forward direction, wherein the address overlap zone is read but the data zone is bypassed while the recording medium is read in the reverse direction; and
authenticating the recording medium by comparing first data read in the forward direction and second data read in the reverse direction, wherein the recording medium is determined to be an original copy when the first data read in the forward direction are different from the second data read in the backward direction.

7. The method of claim 6, wherein the address overlap zone includes original medium identifying information for further authentication of the recording medium.

8. The method of claim 7, wherein the address overlap zone further includes an application program required for reproducing the recording medium such that the recording medium is able to be reproduced when the recording medium is authenticated.

9. The method of claim 8, wherein the recording medium is an optical recording medium including a main content session and an auxiliary content session, and the data region and the address overlap zone are included in the auxiliary content session.

10. The method of claim 9, wherein the main content session includes identifying information indicating that all of data included in the main content session are data contents.

* * * * *